United States Patent
Sass et al.

(10) Patent No.: US 9,838,050 B2
(45) Date of Patent: *Dec. 5, 2017

(54) ANTENNA DRIVER CIRCUIT

(71) Applicant: Continental Automotive GmbH, Hannover (DE)

(72) Inventors: Dieter Sass, Regensburg (DE); Herbert Froitzheim, Pettendorf (DE); Norbert van der Heyd, Bad Abbach (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,513

(22) Filed: Mar. 21, 2016

(65) Prior Publication Data

US 2016/0277085 A1    Sep. 22, 2016

(30) Foreign Application Priority Data

Mar. 19, 2015    (DE) .......................... 10 2015 205 040

(51) Int. Cl.
    *H04B 1/04*          (2006.01)
(52) U.S. Cl.
    CPC ................................ *H04B 1/0483* (2013.01)
(58) Field of Classification Search
    CPC ...... H04B 1/0007; H04B 1/0483; H04B 1/10; H04B 1/525
    USPC ........................................................ 455/129
    See application file for complete search history.

(56) References Cited

U.S. PATENT DOCUMENTS

| 4,500,802 | A | 2/1985 | Janutka .......................... 327/432 |
| 5,905,444 | A | 5/1999 | Zimmer ........................ 340/5.61 |
| 7,683,757 | B2 | 3/2010 | King et al. ..................... 340/5.72 |
| 8,587,403 | B2 | 11/2013 | Ghabra et al. ................ 340/5.61 |
| 2003/0222756 | A1 | 12/2003 | Shimonomoto et al. ..... 340/5.61 |
| 2005/0012393 | A1 | 1/2005 | Elliott et al. .................. 307/10.2 |
| 2005/0162140 | A1 | 7/2005 | Hirst ............................. 323/273 |

(Continued)

FOREIGN PATENT DOCUMENTS

| DE | 19541855 C1 | 2/1997 | ............. B60R 25/20 |
| DE | 102006022853 A1 | 2/2007 | ........... B60R 16/023 |

(Continued)

OTHER PUBLICATIONS

German Office Action, Application No. 102015205038.6, 12 pages, dated Oct. 8, 2015.

(Continued)

*Primary Examiner* — Ajibola Akinyemi
(74) *Attorney, Agent, or Firm* — Slayden Grubert Beard PLLC (57) ABSTRACT

The present disclosure relates to an antenna driver circuit for an antenna associated with a motor vehicle. The antenna driver circuit may include at least one pair of output paths to at least one antenna for forming at least one oscillatory circuit composed of in each case an antenna and at least one capacitor, and a plurality of switches in the form of MOSFETs controlled by control signals in one respective oscillatory circuit with an antenna. In the respective oscillatory circuit, at least two controllable switches may be arranged in an anti-serial fashion with respect to one another in that their drain connections are connected together, and/or source connections of controllable switches are connected to one another via an antenna.

15 Claims, 6 Drawing Sheets

(56) References Cited

U.S. PATENT DOCUMENTS

| | | | |
|---|---|---|---|
| 2006/0125601 A1 | 6/2006 | Onishi | 340/5.72 |
| 2006/0164210 A1 | 7/2006 | Ikeo | 340/5.72 |
| 2007/0026898 A1 | 2/2007 | Nantz et al. | 455/562.1 |
| 2007/0142088 A1 | 6/2007 | Boh et al. | 455/562.1 |
| 2010/0001768 A1* | 1/2010 | Bezooijen | H04B 1/18 327/108 |
| 2010/0195550 A1* | 8/2010 | Nakano | H04B 1/0007 370/311 |
| 2010/0245039 A1 | 9/2010 | Tokunaga | 340/5.61 |

FOREIGN PATENT DOCUMENTS

| | | | |
|---|---|---|---|
| DE | 102006043141 A1 | 5/2007 | H04Q 9/00 |
| DE | 102010016066 A1 | 11/2010 | G08C 17/02 |
| DE | 102010028039 A1 | 12/2010 | B60R 25/00 |
| DE | 102013220596 A1 | 4/2015 | G01R 19/00 |
| DE | 102014222603 B3 | 12/2015 | B60R 25/00 |

OTHER PUBLICATIONS

U.S. Non-Final Office Action, U.S. Appl. No. 15/075,427, 11 pages, dated Dec. 7, 2016.
U.S. Final Office Action, U.S. Appl. No. 15/075,427, 11 pages, dated Mar. 29, 2017.
U.S. Non-Final Office Action, U.S. Appl. No. 15/612,551, 15 pages, dated Jul. 12, 2017.
U.S. Non-Final Office Action, U.S. Appl. No. 15/075,427, 9 pages, dated Jul. 19, 2017.
U.S. Notice of Allowance, U.S. Appl. No. 15/612,551, 12 pages, dated Oct. 26, 2017.

* cited by examiner

ANTENNA DRIVER CIRCUIT

CROSS-REFERENCE TO RELATED APPLICATIONS

This application claims priority to DE Application No. 10 2015 205 040.8 filed Mar. 19, 2015, the contents of which are hereby incorporated by reference in their entirety.

TECHNICAL FIELD

The disclosure relates to an antenna driver circuit and, in particular, to a transmitter device having an antenna multiplexer.

BACKGROUND

Efficient and cost-effective generation and emission of a low-frequency magnetic field with a large range, while complying with radio licensing regulations and with EMC guidelines for automobile manufacturers, is important for antenna driver circuits. The number of antennas for the emission of low-frequency magnetic fields may be limited by the number of driver channels in the driver IC of an antenna driver circuit. For cost reasons, when there is a need for additional antennas, for example in order to cover certain areas in the vehicle which have a strong degree of damping or are adversely effected by control signals it would be possible not to use a second driver IC but instead, for example, to employ an antenna multiplexer, wherein a driver channel can be operated by means of a multiplexer circuit of a plurality antennas in succession.

DE 10 2013 220 596 of Oct. 11, 2013 relates to a quasi-resonant oscillatory circuit driver. DE 10 2014 222 603 of Nov. 5, 2014 relates to the suppression of common-mode emission by means of a circuit arrangement. DE 10 2014 220 406 of Oct. 8, 2014 describes a quasi-resonant oscillatory circuit driver, wherein FIG. 13 thereof shows a driver channel with source connections of transistors which are connected to one another in an anti-serial fashion (=back-to-back). In addition, antenna driver circuits (shown in FIG. 1) in the form of antenna multiplexers in a low-side configuration or high-side configuration are known.

SUMMARY OF THE INVENTION

The teachings of the present disclosure may be used to optimize an antenna driver or a transmitter device with an antenna driver. Various embodiments of the teachings permit a cost-effective extension of the number of antennas for quasi-resonant driver ICs in an antenna controller.

Even after a quasi-resonant oscillation has been switched off by means of control signals before the end of a quasi-resonant oscillation by means of parasitic diodes, MOSFETs still conduct an antenna current until the oscillation energy of the oscillatory circuit is stored in the capacitors and the antenna current becomes virtually zero, wherein the oscillation is then interrupted until the next oscillation of the oscillatory circuit starts as a result of switching on. Time-critical switching of controllable switches for actuating an antenna can be avoided. A control signal can be switched off again in order to select an antenna at the start of emission. This switching on and off can be uncritical in terms of timing. A direct voltage level for suppression of common-mode emission can be connected to the two drain connections of controllable switches, which are arranged in an anti-serial fashion, as a result of which the direct voltage level only becomes effective if an antenna is selected for emission by means of the controllable switches. The controllable switches (in particular MOSFETs) can have control signals which are different from one another and are fed in at their gate inputs, that is to say can be actuated independently of one another by a controller, which permits flexibility, for example in an implementation of the actuation of a plurality of antennas. A control signal of at least one controllable switch for selecting one or more antennas can be switched on at the start of emission by means of said emission and can be switched off at the end of the emission, by means of said emission.

Some embodiments have not only just one oscillatory circuit with an antenna but a plurality of oscillatory circuits with one antenna each, in that two controllable switches are arranged in an anti-serial fashion with respect to one another, wherein in each case their drain connections are connected together. The flexible antenna driver circuit can be an antenna multiplexer, in particular an antenna multiplexer for at least two antennas which can be connected to a pair of output paths.

In some embodiments, controllable switches can each be arranged in an output path to and/or in an oscillatory circuit with just one of a plurality of antennas, in order to switch them separately. At least one controllable switch can also be arranged in output paths to a plurality of antennas and/or in a plurality of oscillatory circuits which are formed from, in each case, one antenna and from at least one capacitor, which can be cost-effective in terms of the number of controllable switches.

In some embodiments, only one controllable switch for a recharging controller for controlling the feeding in of energy from a voltage source with a voltage which is positive with respect to ground into at least one oscillatory circuit which is formed from an antenna and at least one capacitor can be provided or alternatively it is optionally possible to provide a further controllable switch for a recharging controller for controlling the feeding in of energy from a voltage source with a voltage which is negative with respect to ground into at least one oscillatory circuit which is formed from an antenna and at least one capacitor, in order to permit a full-bridge control.

In some embodiments, a zero-crossing detector may detect a zero-crossing of the current flowing to an antenna, in particular in order to interrupt, after a zero-crossing, an oscillation in an oscillatory circuit, formed with an antenna and at least one capacitor, by means of controllable switches.

In some embodiments, it is possible to arrange only some elements of the antenna driver circuit on a circuit board and/or in a module and/or in particular in a (driver) IC, while further elements of the antenna driver circuit, in particular further controllable switches, are arranged in antenna paths and/or capacitors and/or antennas, outside this circuit board and/or this module and/or in particular this (driver) chip, which can be advantageous for the current-carrying capacity in the oscillatory circuit which is formed in this way.

BRIEF DESCRIPTION OF THE DRAWINGS

Further possible advantages and features of refinements of the invention can be found in the following description of exemplary embodiments of the invention which are illustrated in the figures of the drawing, in which.

DETAILED DESCRIPTION

Figure 1:
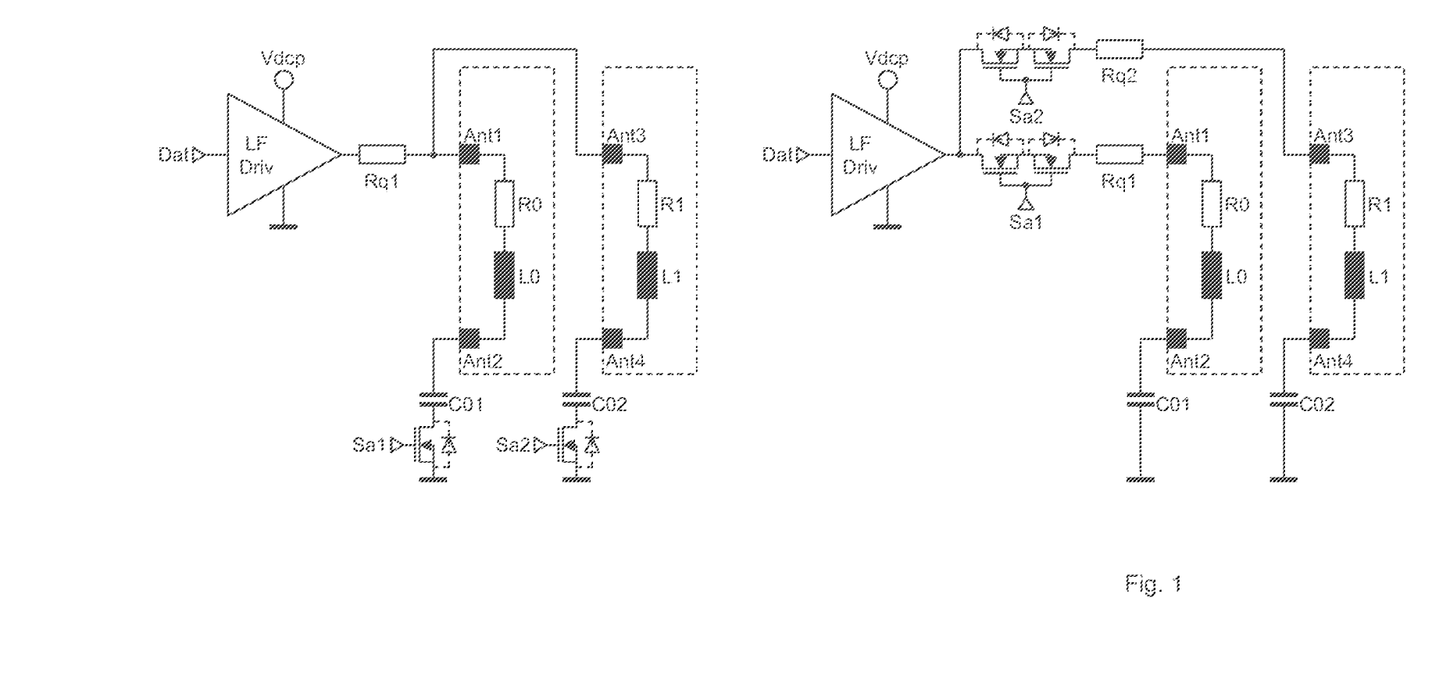
FIG. 1 shows antenna driver circuits in the form of antenna multiplexers on the left in a low-side configuration and on the right in a high-side configuration.

FIG. 1 shows known antenna driver circuits, specifically what is referred to as a low-side multiplexer on the left in FIG. 1 and a high-side multiplexer on the right in FIG. 1. The low-side multiplexer illustrated on the left in FIG. 1 controls two antennas by means of, in each case, one controllable switch, connected in a serial fashion between them and ground, in the form of a MOSFET. The high-side multiplexer illustrated on the right in FIG. 1 controls two antennas by means of, in each case, one controllable switch, connected in a serial fashion between them and a data source (reference symbol Dat), in the form of two MOSFETs (connected to one another by their source inputs). The use of such a high-side antenna multiplexer is possible for a quasi-resonant oscillatory circuit driver, but could have the disadvantage that the transistors which are arranged back-to-back would be connected in series with the antennas and should therefore have a very low impedance in order to avoid reducing the quality of the oscillatory circuit too much.

Figure 2:
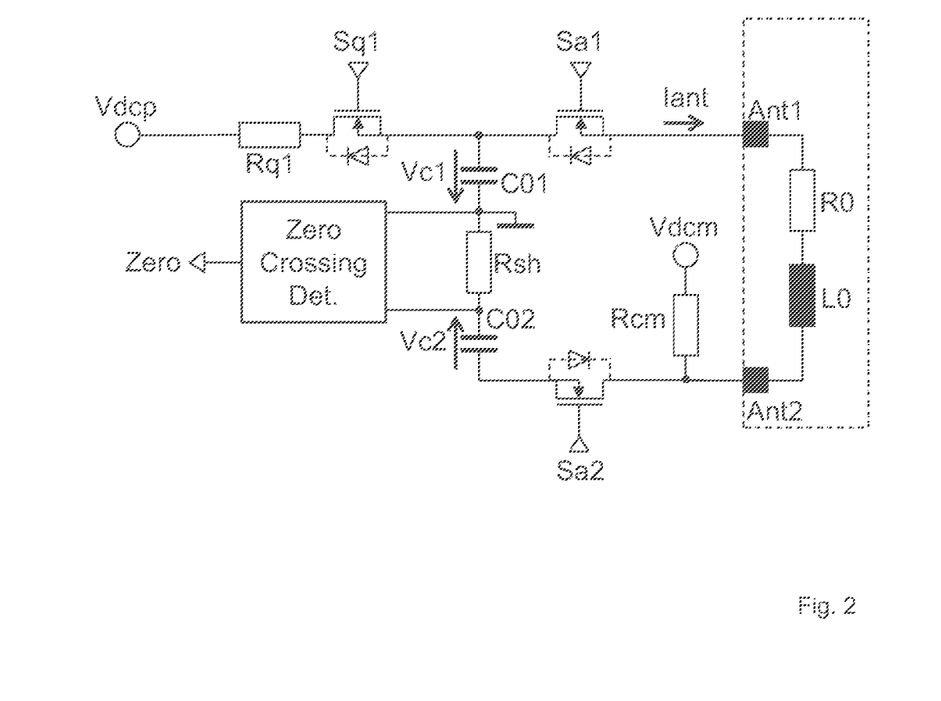
FIG. 2 shows an antenna driver circuit.
Figure 3:
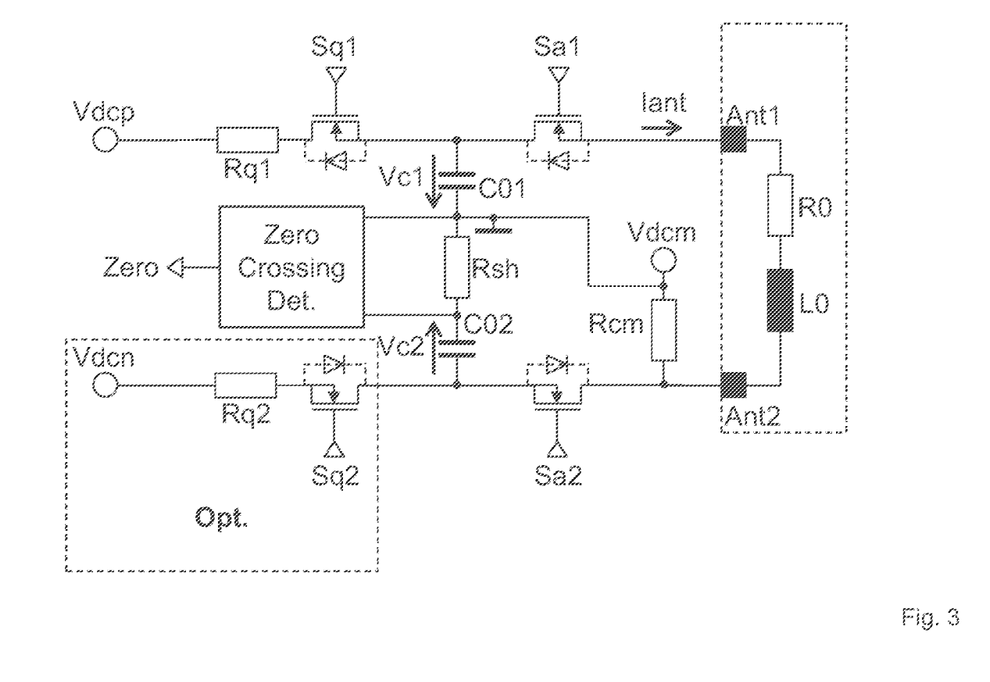
FIG. 3 shows a further antenna driver circuit.

FIG. 2 and FIG. 3 (with optional full-bridge control Opt) each exhibit a quasi-resonant oscillatory circuit driver (suitable for implementations according to the invention), wherein the inductor LO and the resistor RO constitute an equivalent circuit for the LF antenna which is operated by the quasi-resonant oscillatory circuit driver.

Figure 4:
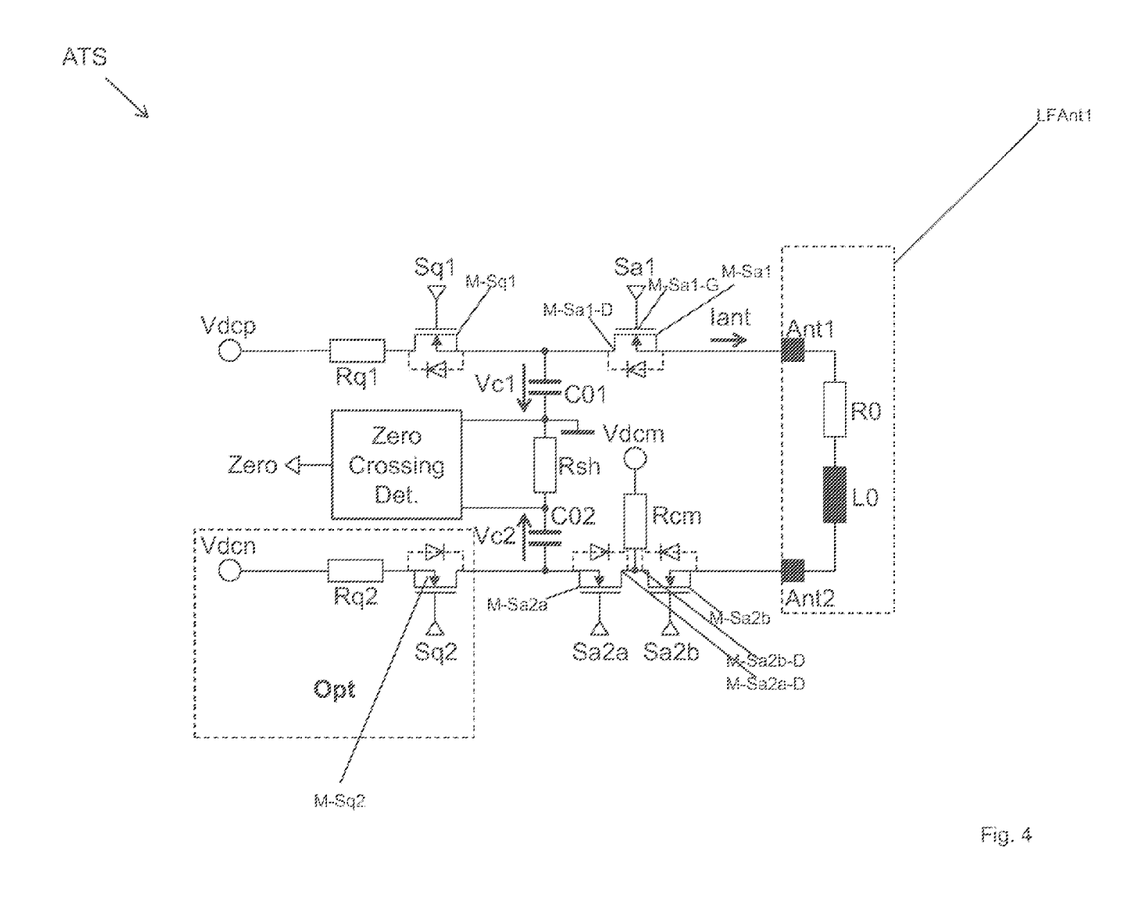
FIG. 4 shows an antenna driver circuit according to the invention for an antenna and with optional full-bridge control.

FIG. 4 shows an embodiment of an antenna driver circuit ATS according to the invention for an antenna LFAnt1, in particular for a motor vehicle. An antenna can be in the text which follows and according to the claims, in particular, what is referred to as an inductive antenna which can be operated, in particular, at a low frequency in order to generate a magnetic field.

The antenna driver circuit ATS which is shown in FIG. 4 has a pair of output paths Ant1, Ant2 to an antenna LFAnt1 for forming an oscillatory circuit from the antenna LFAnt1 and at least one capacitor C01, C02, wherein in the oscillatory circuit with the antenna LFAnt1 controllable switches in the form of MOSFETs M-Sa1, M-Sa2a, M-Sa2b which can each be controlled by control signals Sa1, Sa2a, Sa2b can be actuated (as can therefore also the antenna current Iant) and wherein in the oscillatory circuit with the antenna LFAnt1 two controllable switches M-Sa2a, M-Sa2b are arranged in an anti-serial fashion with respect to one another (can be interpreted, for example, as a mirror-inverted arrangement in serial fashion with respect to connections or back-to-back), in such a way that their drain connections M-Sa2a-D, M-Sa2b-D are connected to another, with, for example, the following possible advantages and/or implementations:

The control signal Sa2a can be switched off at the same time with Sa1 even before the end of a quasi-resonant oscillation. The parasitic diodes of the MOSFETs (M-Sa2a, M-Sa1) which are switched off in this way can conduct the antenna current Iant (of the antenna LFAnt1) until the oscillation energy of the oscillatory circuit is stored (essentially) completely in the capacitors C01 and C02 and the antenna current becomes zero (can be detected by the zero-crossing detector ZeroCrossingDet as a zero-crossing with the output of the signal zero). The oscillation is then interrupted until the next oscillation (of the oscillatory circuit with the antenna LFAnt1 and at least one capacitor) starts as result of the switching on with signals Sa2a and Sa1. The arrangement can avoid time-critical switching of Sa2a and Sa1.

The control signal Sa2b is to be switched on in order to select the antenna (wherein in FIG. 4 only LFAnt1 can be selected, but in FIGS. 5-6 a plurality of antennas can be selected), at the start of the emission (of energy via the antenna/antennas) and switched off again at the end of the entirety of the emitted patterns (or useful data sequence). This switching on and off is not time-critical here either.

The direct voltage level Vdcm for the suppression of the common-mode irradiation is connected here to the two drain connections M-Sa2a-D, M-Sa2b-D of the controllable switches (MOSFET transistors) M-Sa2a, M-Sa2b which are arranged in an anti-serial fashion. Therefore, it is only effective if the antenna LFAnt1 is selected for emission by means of the controllable switch M-Sa2b.

Control signals Sa1, Sa2a, Sa2b (from a controller Ste) which are different from one another and are fed in at the gate inputs G of the controllable switches (MOSFETs) M-Sa1, M-Sa2a, M-Sa2b can be present at said controllable switches.

Figure 5:
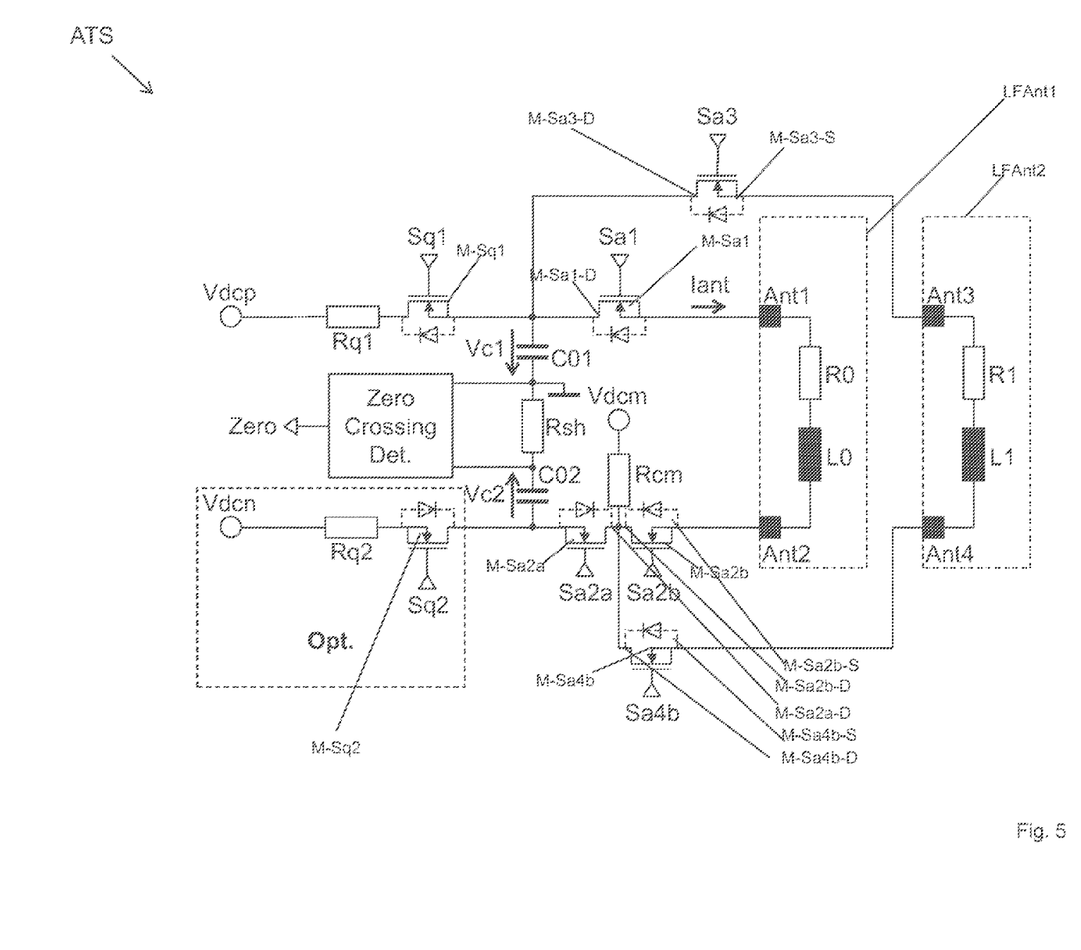
FIG. 5 shows an antenna driver circuit according to the invention for a plurality of antennas and with optional full-bridge control.
Figure 6:
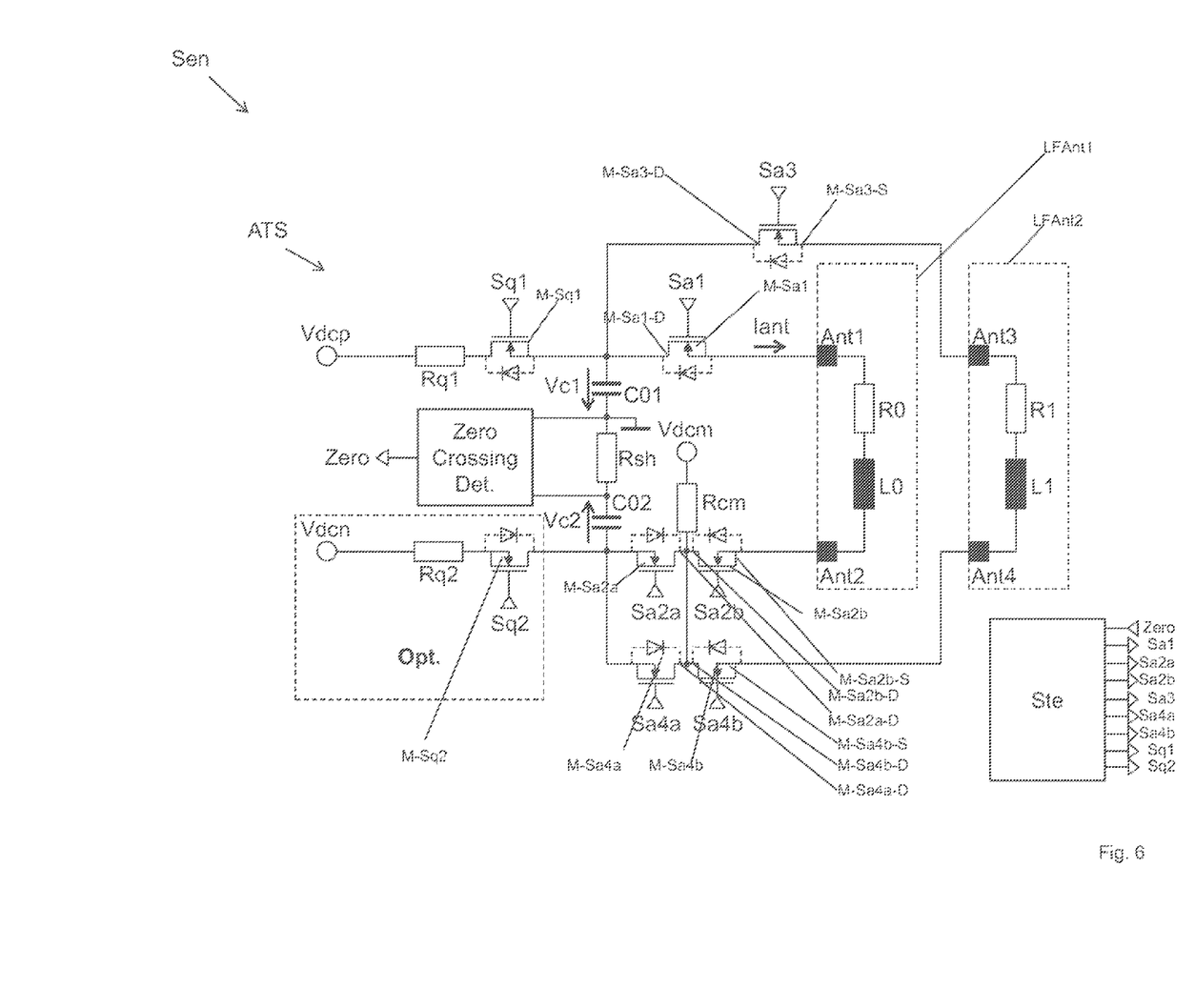
FIG. 6 shows a further antenna driver circuit according to the invention for a plurality of antennas with switching elements which are, for example, external to a chip.

An antenna driver circuit ATS in FIGS. 4-6 has here at least one controllable switch in the form of a MOSFET M-Sq1 for the recharging controller, that is to say controlling the feeding in of energy from a voltage source Vdcp with a voltage which is positive with respect to ground into at least one oscillatory circuit (a plurality thereof in FIGS. 5-6) formed in each case from an antenna LFAnt1 and at least one capacitor C01, C02.

An antenna driver circuit ATS in FIGS. 4-6 optionally also has a full-bridge control Opt which is provided with a controllable switch in the form here of a MOSFET M-Sq2 as a recharging controller for controlling the feeding in of energy from a voltage source Vdcn with a voltage which is negative with respect to ground, into at least one oscillatory circuit which is formed in each case from an antenna LFAnt1 and at least one capacitor C01.

An antenna driver circuit ATS without optional full-bridge control Opt can be somewhat more cost-effective, and an antenna driver circuit ATS with optional full-bridge control Opt could make more energy available and/or operate in a more symmetrical way.

The voltage VC1 at the capacitor C01 and the voltage VC2 at the capacitor C02 are, without the full-bridge control Opt, between the voltages zero and Vdcp (0<VC1<+VDCp, 0<VC2<VDCp). The voltage VC1 at the capacitor C01 and the voltage VC2 at the capacitor C02 are, with full-bridge control Opt, between the voltages Vdcn and Vdcp (Vdcn<VC1<+VDCp, Vdcn<VC2<VDCp). The voltage level Vdcm can be, for example, Vc1/2 in the case of half-bridge operation (without full-bridge control Opt) and ground in full-bridge operation (with full-bridge control Opt).

The antenna driver circuit ATS which is shown in FIG. 5 has two pairs of output paths Ant1, Ant2; Ant3, Ant4 to in each case one of the antennas LFAnt1, LFAnt2 (for forming in each case an oscillatory circuit composed of in each case one antenna LFAnt1, LFAnt2 with at least one capacitor C01, C02).

In the oscillatory circuit with the antenna LFAnt1, switches in the form of MOSFETs M-Sa1, M-Sa2a, M-Sa2b, which can each be controlled by means of control signals Sa1, Sa2a, Sa2b, can be actuated, wherein in the oscillatory circuit with the antenna LFAnt1 two controllable switches M-Sa1, M-Sa2b are arranged in an anti-serial fashion with respect to one another in such a way that their drain connections M-Sa1-D, M-Sa2b-D are connected to one another (via further elements Sa2a, C02, Rsh, C01), as a result of which the first antenna LFAnt1 is disconnected and/or can be disconnected from the driver structure (voltage sources, capacitors etc.).

In the second oscillatory circuit with the second antenna LFAnt2, switches in the form of MOSFETs M-Sa3, M-Sa4b, M-Sa2a, which can each be controlled by means of control signals Sa3, Sa4b, Sa2, are provided, wherein in the second oscillatory circuit with the second antenna LFAnt2 two controllable switches M-Sa3, M-Sa4b are arranged in an anti-serial fashion with respect to one another, in that their drain connections M-Sa3, M-Sa4b-D are connected to one another (by means of further elements Sa2a, C02, Rsh, C01 in a serial fashion between them).

In this context, the controllable switch Sa2a does not have to be multiplied (that is to say provided in multiple) but instead can be used to control multiple antennas LFAnt1, LFAnt2 or all of said antennas.

A short circuit which occurs to ground at one of the antenna connections Ant1, Ant2 or Ant3, Ant4 of an antenna LFAnt1 or LFAnt2 can permit a half-bridge operation of the respective other antenna/antennas LFAnt2 or LFAnt1.

The direct voltage level for the suppression of the common-mode irradiation is here switched at the drain connections M-Sa1-D, M-Sa2b-D or M-Sa3, M-Sa4b-D of the (pairs of) anti-serial, controllable switches (MOSFET transistors for antenna control). Thus it is in each case only effective for the antenna(s), which is(are) currently selected for a radiation by means of controllable switches Sa2b or Sa4b.

The antenna driver circuit ATS shown in FIG. 6, additionally has, compared to FIG. 5, a further switch in the form of the MOSFET M-Sa4a auf, which can be controlled (by means of a controlled signal Sa4a) and which is connected in parallel with the controllable switch M-Sa2a. The controllable switch M-Sa4a can increase the current-carry capability of the arrangement because the controllable switch M-Sa2a does not have to be used any more for operating any antenna LFAnt1, LFAnt2 (in contrast to the arrangement in FIG. 4).

In some embodiments, the controllable switches M-Sa1, M-Sa2a and M-Sa2b can be integrated as switches for the operation of the first antenna LFAnt1 in a (driver) IC; the controllable switches M-Sa3, M-Sa4a and M-Sa4b are not integrated into this IC etc. here and when the number of antennas or antenna channels is increased by a further antenna (for example the antenna LFAnt2 in FIG. 5 or 6 in addition to the antenna LFAnt1 in FIG. 4, or even a further antenna) are mounted or added when necessary. The second antenna LFAnt2 is therefore operated in a resonance circuit which does not contain integrated components (integrated in the specified (driver) IC etc.). The current-carrying capability of the resonant circuit of the second antenna LFAnt2 therefore would not have to be limited by integrated components (integrated in the specified (driver) IC etc.) but rather could be defined by the selection of the discrete components in the resonant circuit of the second antenna LFAnt2.

In addition, for the sake of illustration, FIG. 6 shows in a simplified schematic fashion a controller Ste which generates control signals for the antenna driver circuit ATS or receives said signals from it (zero), and forms a transmitter device Sen together with said antenna driver circuit ATS and antennas.

The invention claimed is:

1. An antenna driver circuit for an antenna associated with a motor vehicle, the antenna driver circuit comprising:
   at least one pair of output paths to at least one antenna for forming at least one oscillatory circuit composed of in each case an antenna and at least one capacitor,
   a plurality of switches in the form of MOSFETs controlled by control signals in one respective oscillatory circuit with an antenna,
   a plurality of pairs of output paths wherein one antenna of at least two antennas for transmitting at least one signal is connected to one pair of output paths,
   one pair of output paths is connected to one of the antennas, and
   two controllable switches are arranged in an anti-serial fashion with respect to one another in that their drain connections are connected to one another and/or their source connections are connected to one another via the respective antenna.

2. The antenna driver circuit as claimed in claim 1, wherein one or more or all of the controllable switches have control signals which are different from one another and/or are fed in separately at their gate inputs.

3. The antenna driver circuit as claimed in claim 1, wherein:
   one or more capacitors are arranged so as to store oscillation energy of one or more antennas, by means of controllable switches provided between the at least one capacitor and an antenna, and
   wherein the antenna driver circuit is preferably designed in such a way that a control signal of a controllable switch is switched off simultaneously with a control signal of a further controllable switch even before an end of a quasi-resonant oscillation.

4. The antenna driver circuit as claimed in claim 1, wherein a control signal of at least one controllable switch for selecting one or more antennas is switched on at the start of emission by means of the one or more antennas and is switched off at the end of the emission by means of the one or more antennas.

5. The antenna driver circuit as claimed in claim 1, wherein a voltage source is connected to a direct voltage level for suppressing common-mode emission at both drain connections of at least one pair of controllable switches which are connected to one another in an anti-serial fashion, which switches are connected to an antenna in a serial fashion.

6. The antenna driver circuit as claimed in claim 1, wherein the antenna driver circuit is an antenna multiplexer for the at least two antennas which can be connected to a pair of output paths and/or for at least two signals which are to be transmitted.

7. The antenna driver circuit as claimed in claim 1, wherein a plurality of the controllable switches are each arranged in a pair of output paths to and/or in an oscillatory circuit with just one of the one or more antennas.

8. The antenna driver circuit as claimed in claim 1, wherein at least one controllable switch is arranged in pairs of output paths to the one or more antennas and/or in a plurality of oscillatory circuits which are formed from, in each case, one of the one or more antennas and a capacitor.

9. The antenna driver circuit as claimed in claim 1, further comprising:
   a controllable switch for a recharging controller for controlling the feeding in of energy from a voltage source with a voltage which is positive with respect to ground into at least one oscillatory circuit which is formed from one of the one or more antennas, and
   a capacitor.

10. The antenna driver circuit as claimed in claim 1, wherein only some elements of the antenna driver circuit are arranged on a circuit board and/or in a module and/or in an IC, while further elements of the antenna driver circuit, in particular further controllable switches, are arranged in antenna paths and/or capacitors and/or the one or more antennas, outside this circuit board and/or this module and/or this IC and can be or are connected thereto.

11. The antenna driver circuit as claimed in claim 1, wherein only some elements of the antenna driver circuit are arranged on a circuit board and/or in a module and/or in an IC, and all the elements of the antenna driver circuit which are located in an oscillatory circuit which is formed from an antenna and a capacitor are arranged outside this circuit board and/or this module and/or this IC and can be connected thereto.

12. The antenna driver circuit as claimed in claim 1, wherein at least two controllable switches are arranged in an anti-serial fashion with respect to one another in an oscillatory circuit with one of the one or more antennas in that their drain terminals are connected to one another without an element connected in a serial fashion between them and/or directly.

13. The antenna driver circuit as claimed in claim 1, wherein at least two controllable switches are arranged in an anti-serial fashion with respect to one another, in that their drain connections are connected to one another at least by means of a capacitor located between them and/or at least one controllable switch located between them.

14. An antenna driver circuit for an antenna associated with a motor vehicle, the antenna driver circuit comprising:
   a pair of output paths to an antenna for forming an oscillatory circuit composed of an antenna and at least one capacitor;
   a plurality of MOSFETs controlled by control signals in the oscillatory circuit;
   a controllable switch for a recharging controller controlling the supply of energy from a voltage source with a positive voltage with respect to ground into the oscillatory circuit; and
   a capacitor;
   wherein the oscillatory circuit comprises at least two controllable switches arranged in an anti-serial fashion with respect to one another in that their drain connections are connected together, and/or their source connections are connected to one another via an antenna.

15. An antenna driver circuit for an antenna associated with a motor vehicle, the antenna driver circuit comprising:
   a pair of output paths to an antenna for forming an oscillatory circuit composed of an antenna and at least one capacitor;
   a plurality of MOSFETs controlled by control signals in the oscillatory circuit;
   wherein the oscillatory circuit comprises at least two controllable switches arranged in an anti-serial fashion with respect to one another in that their drain connections are connected together at least by means of a capacitor or a controllable switch located between them, and/or their source connections are connected to one another via an antenna.

* * * * *